United States Patent [19]

Cheng

[11] Patent Number: 5,590,869
[45] Date of Patent: Jan. 7, 1997

[54] ADJUSTABLE BUFFER DEVICE FOR A BICYCLE

[75] Inventor: Paul Cheng, Tainan, Taiwan

[73] Assignee: Taiwan Hodaka Industrial Co., Ltd., Taiwan

[21] Appl. No.: 574,651

[22] Filed: Dec. 19, 1995

[51] Int. Cl.⁶ ........................................... B62J 1/02
[52] U.S. Cl. .................................... 267/132; 280/284
[58] Field of Search ................ 267/34, 217, 218; 188/289, 299, 312, 318, 322.14, 314; 280/284, 276

[56] References Cited

U.S. PATENT DOCUMENTS

| | | | |
|---|---|---|---|
| 1,584,836 | 5/1926 | Bowers | 267/34 |
| 1,956,383 | 4/1934 | Funston | 188/318 |
| 2,108,881 | 2/1938 | Casper | 188/318 |
| 3,991,863 | 11/1976 | Lee | 188/289 |
| 5,320,375 | 6/1994 | Reeves et al. | 280/284 |

*Primary Examiner*—Robert J. Oberleitner
*Assistant Examiner*—Pamela Lipka
*Attorney, Agent, or Firm*—Bacon & Thomas

[57] ABSTRACT

An adjustable buffer device is disposed between one end of the rear stay and the central portion of a cross bar. The adjustable buffer device has a hollow main body, a seal ring, a shaft cover, a shaft, a spring, and an adjustable valve. A cover seat is disposed on the upper portion of the main body. A valve seat is disposed beneath the cover seat. The adjustable valve which is inserted in the inner chamber of the valve seat controls the amount of oil in the passage between the oil hole and the communicating hole.

2 Claims, 4 Drawing Sheets

ADJUSTABLE BUFFER DEVICE FOR A BICYCLE

BACKGROUND OF THE INVENTION

The invention relates to all adjustable buffer device for a bicycle. More particularly, the invention relates to an adjustable buffer device which can be adjusted easily.

The buffer pressure of a conventional oil-cylinder type buffer is adjusted by the adjustment of the compressed spring which encloses a portion of the oil-cylinder type buffer. However, it is difficult to adjust conventional buffers of a bicycle. The user has to stop the bicycle in order to adjust the buffer. The user may ride the bicycle along various rough roads. Thus the user should stop the bicycle many times according to the bumping conditions of the rough roads in order to adjust the buffer effectively.

SUMMARY OF THE INVENTION

The present invention provides an adjustable buffer device for a bicycle to avoid the disadvantages of the conventional oil-cylinder type buffer. The shock which is produced by the rear wheel can be reduced significantly by the adjustable buffer device.

Therefore, an object of the present invention is to provide an adjustable buffer device for a bicycle which can be adjusted easily.

Another object of the present invention is to provide an adjustable buffer device for a bicycle which can be adjusted according to the bumping conditions of the road without stopping the bicycle.

Accordingly, an adjustable buffer device has a hollow main body, a seal ring, a shaft cover, a shaft and a spring. The main body which has threads on the outer periphery of the main body has a circular recess on the inner lower periphery of the main body, a cover seat on the upper portion of the main body, and a valve seat beneath the cover seat. An adjustable ring which passes through the threads of the main body is disposed beneath the cover seat. The seal ring is disposed in the cover seat. A hollow interior is formed in the cover seat. A shaft cover which has a soft pad therein and a top with a round hole on the side periphery of the top covers the cover seat. The soft pad is disposed between the shaft cover and the seal ring. A shaft which is disposed in the main body therein is inserted through a buffer ring, a hollow cylindrical seat, and a retaining ring. The top portion of the shaft is inserted in a hollow piston in order to position the piston. The retaining ring is inserted in the circular recess in order to restrict and position the cylindrical seat. The lower portion of the shaft is disposed outside the main body. A shaft seat ring is disposed on top of a shaft seat. A cushion ring is inserted in the shaft seat ring. The cushion ring, the shaft seat ring and the shaft seat are inserted by the lower portion of the shaft. The shaft seat has a through hole to receive one end of the rear stay. A spring which surrounds the main body is located between the adjustable ring and the shaft seat ring. The valve seat has an inner chamber, a communicating hole and an oil hole communicating with the inner chamber. The oil hole communicates with the interior of the main body. The middle portion of the inner chamber has an inner thread. The rear portion of the inner chamber has a positioning thread. An adjustable valve is inserted in the inner chamber. The adjustable valve has a rotary knob, an adjusting rod, and a positioning seat with a tapered end. The upper portion of the adjusting rod is surrounded by the positioning seat. The top portion of the adjusting rod is covered by the rotary knob. A threaded fastener fastens the rotary knob and the adjusting rod together. The positioning seat engages with the positioning thread. The middle portion of the adjusting rod has an outer thread engaging with the inner thread. A groove is formed on the periphery of the adjusting rod to receive a spring and a ball. The ball abuts the spring and the positioning seat. An oil ring is disposed on the opening of the inner chamber and positioned by the positioning seat. The adjustable valve controls a volume of a passage between the oil hole and the communicating hole.

DETAILED DESCRIPTION OF THE INVENTION

Figure 1:
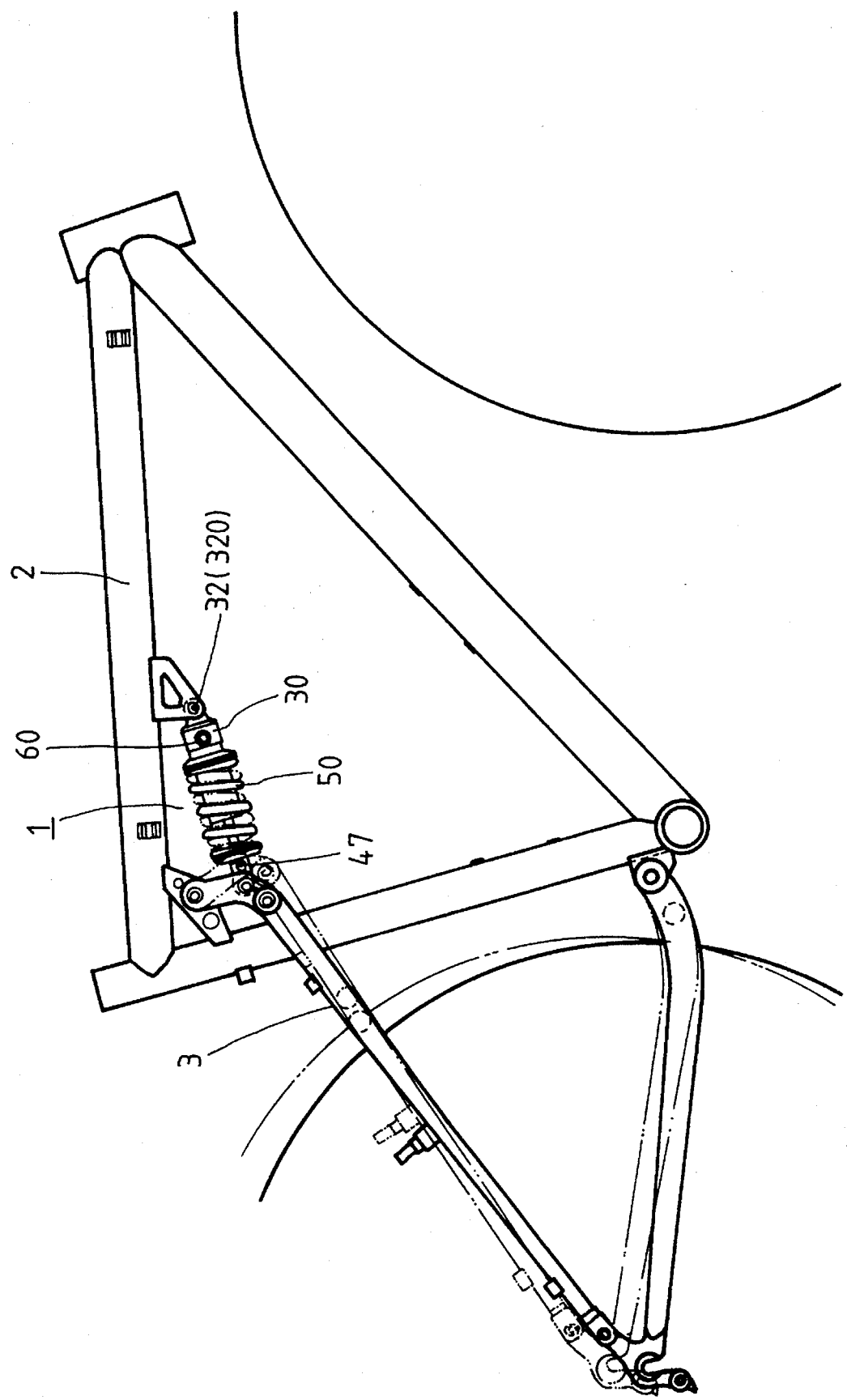
FIG. 1 is a schematic view illustrating an adjustable buffer device mounted on a bicycle in accordance with the invention.

Referring to FIG. 1, an adjustable buffer device 1 is disposed between one end of the rear stay 3 and the central portion of a cross bar 2. The shock which is produced by the rear wheel can be reduced significantly by the adjustable buffer device 1. Thus the rider will not feel uncomfortable while riding a bicycle along a rough road. The rider can ride the bicycle steadily so that the rider will not fall down with the bicycle.

Figure 2:
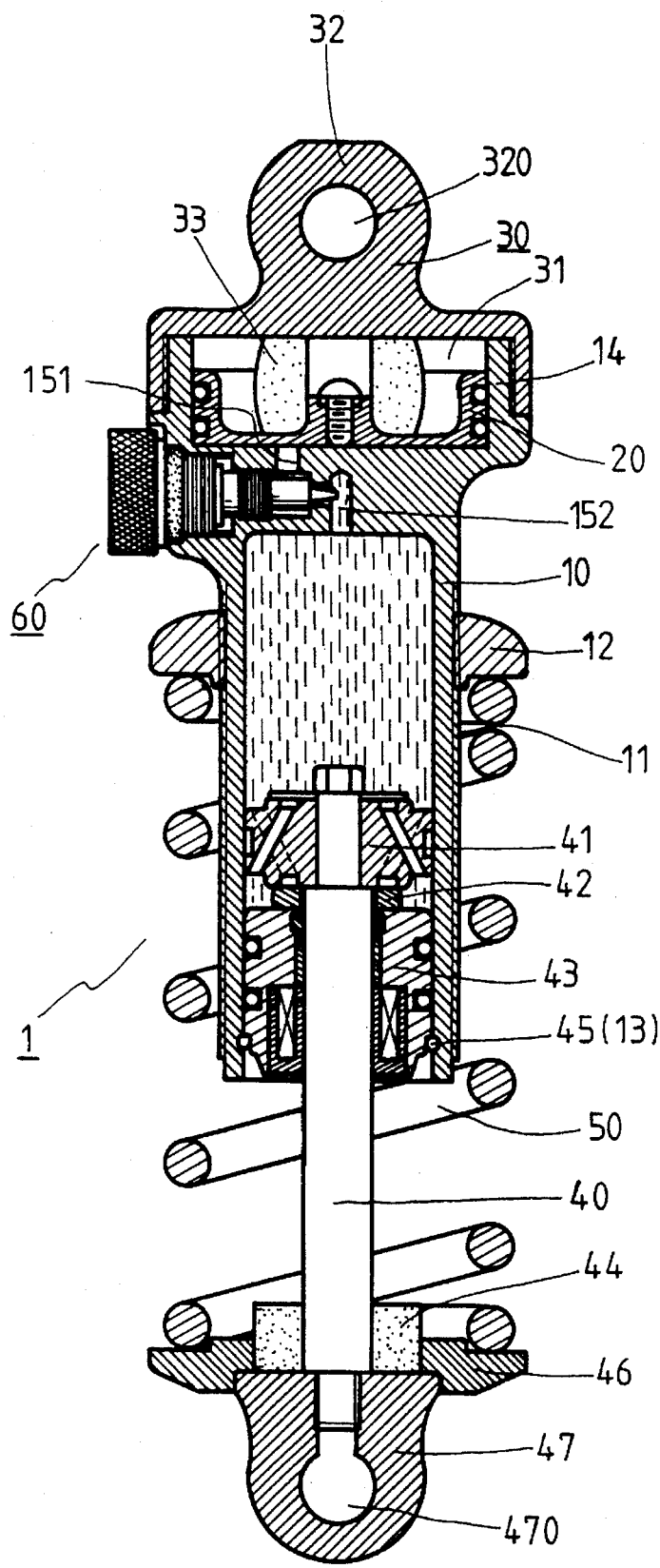
FIG. 2 is a cross-sectional view of an adjustable buffer device in accordance with the invention.
Figure 3:
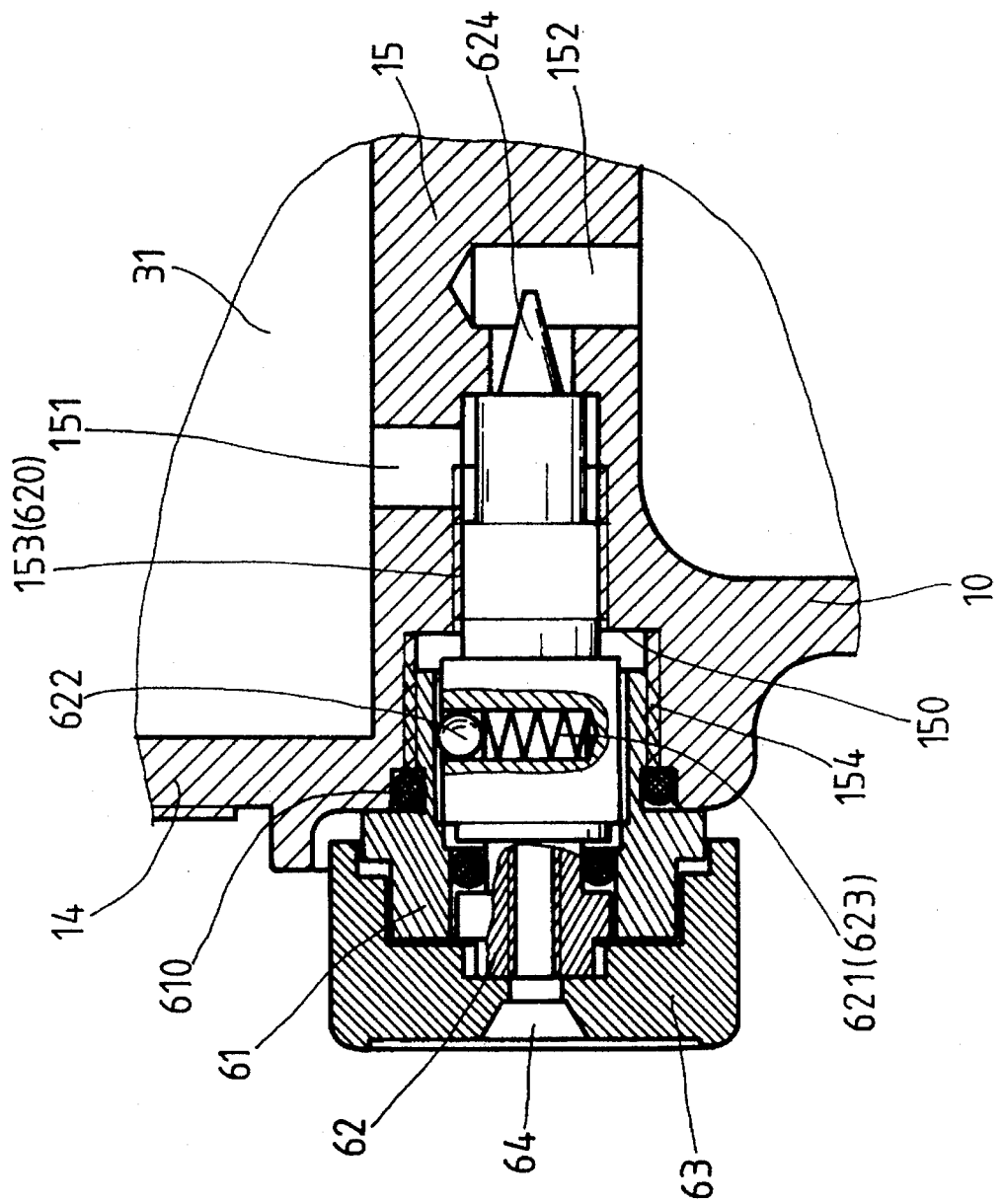
FIG. 3 is a cross-sectional view of an adjustable valve.

Referring to FIGS. 2 and 3, the adjustable buffer device 1 has a hollow main body 10, a seal ring 20, a shaft cover 30, a shaft 40 and a spring 50. The main body 10 which has threads 11 on the outer periphery of the main body 10 has a circular recess 13 on the inner lower periphery of the main body 10, a cover seat 14 on the upper portion of the main body 10, and a valve seat 15 beneath the cover seat 14. The bore of the cover seat 14 is larger than that of the main body 10. An adjustable ring 12 which passes through the threads 11 of the main body 10 is disposed beneath the cover seat 14. The seal ring 20 which has a diameter the same as that of the main body 10 is disposed in the cover seat 14. A hollow interior 31 is formed in the cover seat 14. A shaft cover 30 which has a soft pad 33 therein and a top 32 with a round hole 320 on the side periphery of the top 32 covers the cover seat 14. The soft pad 33 is disposed between the shaft cover 30 and the seal ring 20. A shaft 40 which is disposed in the main body 10 is inserted through a buffer ring 42, a hollow cylindrical seat 43, and a retaining ring 45. The top portion of the shaft 40 is inserted in a hollow piston 41 in order to position the piston 41. The retaining ring 45 is inserted in the circular recess 13 of the main body 10 in order to restrict and position the cylindrical seat 43. The cushion ring 44 is inserted in the shaft seat ring 46. The lower portion of the shaft 40 is disposed outside the main body 10. The shaft seat ring 46 is disposed on top of a shaft seat 47. The cushion ring 44, the shaft seat ring 46 and the shaft seat 47 are inserted by the lower portion of the shaft 40. The shaft seat 47 has a through hole 470 to receive one end of the rear stay 3. A spring 50 which surrounds the main body 10 is located between the adjustable ring 12 and the shaft seat ring 46.

Referring to FIG. 3 again, the valve seat 15 has an inner chamber 150 therein, a communicating hole 151 and an oil hole 152 communicating with the inner chamber 150. The oil hole 152 communicates with the interior of the main body 10. The middle portion of the inner chamber 150 has an inner thread 153. The rear portion of the inner chamber 150 has a positioning thread 154. An adjustable valve 60 is inserted in the inner chamber 150. The adjustable valve 60 has a rotary knob 63, an adjusting rod 62, and a positioning seat 61 with a tapered end 624. The upper portion of the adjusting rod 62 is surrounded by the positioning seat 61. The top portion of the adjusting rod 62 is covered by the rotary knob 63. A threaded fastener 64 such as a bolt fastens the rotary knob 63 and the adjusting rod 62 together. The positioning seat 61 engages with the positioning thread 154. The middle portion of the adjusting rod 62 has an outer thread 620 engaging with the inner thread 153. A groove 623 is formed on the periphery of the adjusting rod 62 to receive a spring 621 and a ball 622. The ball 622 abuts the spring 621 and the positioning seat 61. An oil ring 610 is disposed on the opening of the inner chamber 150 and positioned by the positioning seat 61. The adjustable valve 60 controls the amount of oil ill the passage between the oil hole 152 and the communicating hole 151.

Figure 4:
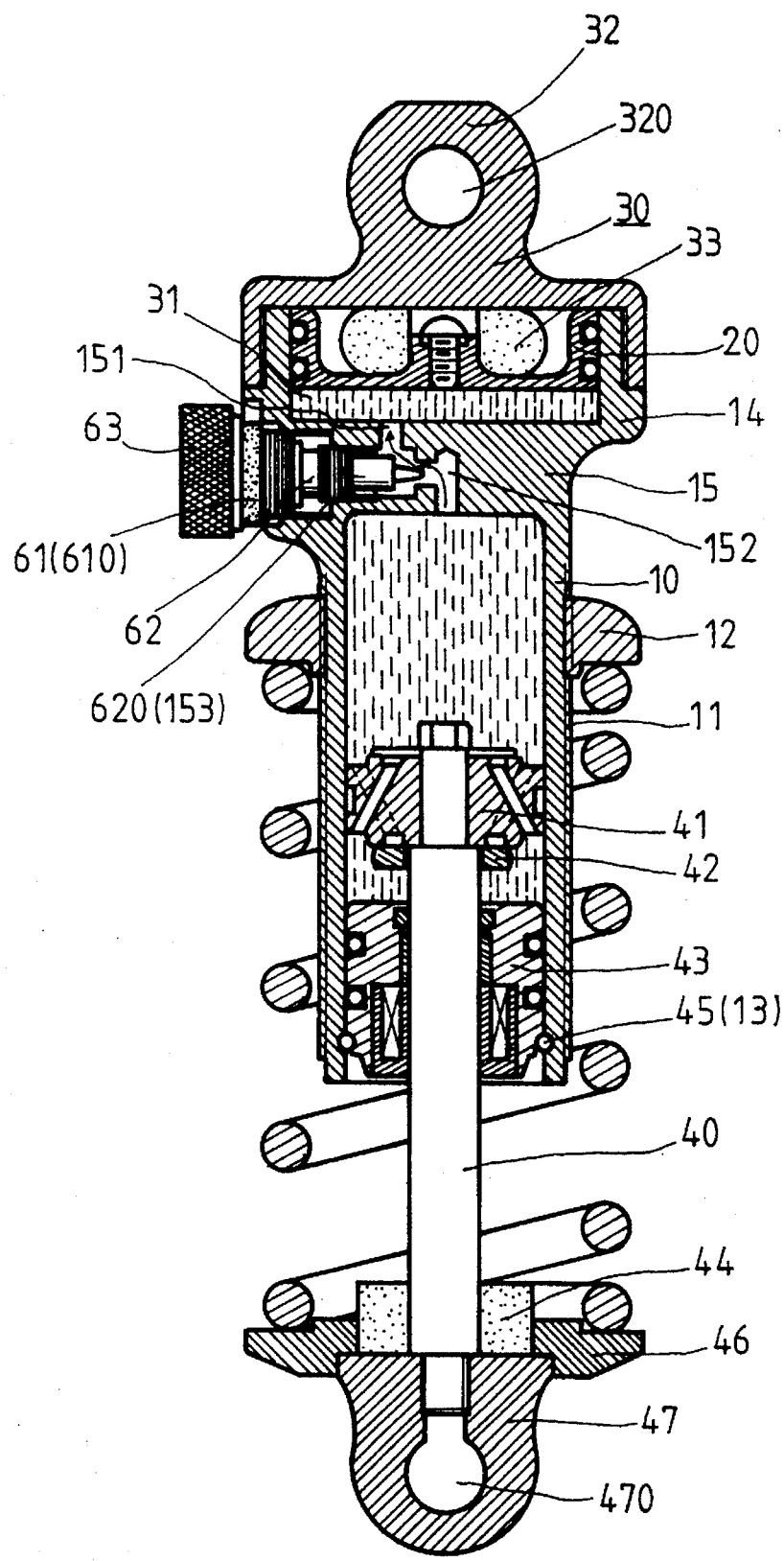
FIG. 4 is a schematic view illustrating the operation of an adjustable buffer device.

Referring to FIGS. 1 to 4, the adjustable valve 60 can be adjusted. The user can adjust the rotary knob 63 according to the bumping conditions of the road without stopping the bicycle. The adjusting rod 62 can shift along the inner chamber 150. While the adjusting rod 62 shifts outward, the volume of the passage between the oil hole 152 and the communicating hole 151 is enlarged (as shown in FIG. 4). Thus the oil will enter the oil hole 152, the communicating hole 151 and the hollow interior 31 of the cover seat 14 from the main body 10 to push the seal ring 20 moving upward while the shaft 40 and the piston 41 move upward. Therefore, the bumping pressure is released. While the adjusting rod 62 shifts inward ultimately, the passage between the oil hole 152 and the communicating hole 151 is blocked by the adjusting rod 62 (as shown in FIG. 2). The tapered end 624 blocks the oil hole 152 also. Thus the volume of the passage is reduced significantly. Further, the ball 622 touches the positioning seat 61 so that the adjusting rod 62 can shift smoothly.

The invention is not limited to the above embodiment but various modification thereof may be made. It will be understood by those skilled in the art that various changes in form and detail may be made without departing from the scope of the invention.

I claim:

1. An adjustable buffer device comprising:

a hollow main body having a thread on an outer periphery of said main body, a circular recess on an inner lower periphery of said main body, a cover seat on an upper portion of said main body, and a valve seat beneath said cover seat;

an adjustable ring which passes through said thread of said main body disposed beneath said cover seat;

a seal ring disposed in said cover seat;

a hollow interior formed in said cover seat;

a shaft cover which has a soft pad therein and a top with a round hole;

said soft pad disposed between said shaft cover and said seal ring;

a shaft which is disposed in said main body inserted through a buffer ring, a hollow cylindrical seat, and a retaining ring;

said retaining ring inserted in said circular recess to restrict and position said cylindrical seat;

a top portion of said shaft inserted in a hollow piston to position said piston;

a lower portion of said shaft disposed outside said main body;

a shaft seat ring disposed on top of a shaft seat;

a cushion ring inserted in said shaft seat ring;

said cushion ring, said shaft seat ring and said shaft seat inserted by a lower portion of said shaft;

a spring which surrounds said main body being located between said adjustable ring and said shaft seat ring;

a valve seat having an inner chamber, a communicating hole and an oil hole communicating with said inner chamber;

said oil hole communicating with an interior of said main body;

a middle portion of said inner chamber having an inner thread;

a rear portion of said inner chamber having a positioning thread;

an adjustable valve inserted in said inner chamber;

said adjustable valve having a rotary knob, an adjusting rod, and a positioning seat with a tapered end;

an upper portion of said adjusting rod surrounded by said positioning seat;

a top portion of said adjusting rod covered by said rotary knob;

a threaded fastener fastening said rotary knob and said adjusting rod together;

said positioning seat engaging with said positioning thread;

a middle portion of said adjusting rod having an outer thread engaging with said inner thread;

an oil ring disposed on an opening of said inner chamber and positioned by said positioning seat; and wherein said adjustable valve controls a volume of a passage between said oil hole and said communicating hole.

2. An adjustable buffer device as claimed in claim 1, wherein a groove is formed on a periphery of said adjusting rod to receive a spring and a ball.

* * * * *